US007914370B2

(12) United States Patent
Weller

(10) Patent No.: US 7,914,370 B2
(45) Date of Patent: Mar. 29, 2011

(54) METHOD AND APPARATUS FOR PLAYING GAMES

(75) Inventor: Scott Weller, Salem, MA (US)

(73) Assignee: GameLogic Inc., Waltham, MA (US)

( * ) Notice: Subject to any disclaimer, the term of this patent is extended or adjusted under 35 U.S.C. 154(b) by 1097 days.

(21) Appl. No.: 11/371,171

(22) Filed: Mar. 8, 2006

(65) Prior Publication Data

US 2006/0214376 A1 Sep. 28, 2006

Related U.S. Application Data

(60) Provisional application No. 60/659,849, filed on Mar. 8, 2005.

(51) Int. Cl.
*A63F 13/00* (2006.01)

(52) U.S. Cl. ........ 463/16; 463/20

(58) Field of Classification Search ........ 463/16–20, 463/26
See application file for complete search history.

(56) References Cited

U.S. PATENT DOCUMENTS 5,910,048 A * 6/1999 Feinberg ........ 463/25
6,267,671 B1 7/2001 Hogan
6,319,122 B1 * 11/2001 Packes et al. ........ 463/16
2002/0028706 A1 * 3/2002 Barnard et al. ........ 463/26
2003/0146574 A1 8/2003 Duhamel
2003/0211878 A1 11/2003 Walker et al.
2004/0111358 A1 * 6/2004 Lange et al. ........ 705/37
2005/0001379 A1 1/2005 Moore, Jr.
2005/0003886 A1 1/2005 Englman et al.

* cited by examiner

*Primary Examiner* — David L Lewis
*Assistant Examiner* — Eric M Thomas
(74) *Attorney, Agent, or Firm* — Lando & Anastasi, LLP

(57) ABSTRACT

A system and methods of playing wagering games of chance in which a player receives points based on game play, the points being usable toward either a cumulative jackpot or entry into another game which may be a game of skill or chance. In one example, a system and method for a “double chance” game links progress in a second game to the results of a first game. A player receives a chance at playing the second game based on winning or losing the first game, thereby providing the player with two chances to win for one entry into a game session. A player participating in the first game receives points, based on a result of the first game, that may be used to play a second game or may be redeemed for one or more prizes, as discussed below. The points may embody the player’s chance for winning the second game. In one example game format, the points may be awarded for “losing” the first game, thereby providing a dual incentive to a player to play the game—the player may achieve the game’s payout by winning the game or may accrue points by losing the game. In such a manner, a player’s interest in playing the first game may be increased because of additional chances to win offered by the second game (or selection of prizes) associated with the points the player receives during play of the first game.

16 Claims, 2 Drawing Sheets

METHOD AND APPARATUS FOR PLAYING GAMES

RELATED APPLICATIONS

This application claims priority under 35 U.S.C. §119(e) to U.S. Provisional Application Ser. No. 60/659,849 entitled "METHOD AND APPARATUS FOR PLAYING GAMES," filed on Mar. 8, 2005, which is herein incorporated by reference in its entirety.

BACKGROUND OF INVENTION

1. Field of the Invention

This application is directed to methods of gaming and more particularly, to systems and methods of conducting Internet-based and/or casino-based wagering games of chance and skill.

2. Discussion of the Related Art

Legalized public and private wagering games of chance and/or skill abound in the United States and throughout the world. Some examples of common wagering games of chance include Bingo, Keno, slots and others.

Bingo-type games involve a plurality of participants each having at least one pre-printed playing card that has printed on it a population of numbers arranged in a matrix. The game is played by randomly selecting winning numbers from the population of numbers. In a traditional bingo game, a participant wins when a combination of selected winning numbers covers at least one row, column, and/or diagonal of five numbers on at least one participant's playing card. However, numerous other patterns that have been predetermined may also be used for winning. Some examples of such patterns include "Hard Way" (five-in-a-row without using the free spot) and "Six Pack" (2×3 or 3×2 matrix). Verification of the win occurs immediately and if the win is verified, the game ends and no further numbers are drawn. Generally, there is only a single winner for each game. If there are multiple winners, the prize is divided equally among all winners.

Keno is another type of legalized public and private game common in the United States and throughout the world. Keno-type games are played using a card that has a population of numbers, usually about 80 different numbers, printed thereon. A player picks a selection of numbers, usually up to about fifteen. At set times, a computer or person draws a selection of random winning numbers and the player marks the winning numbers on his/her card to see whether any winning numbers match the numbers the player initially selected. At the end of the drawing, the number of matched numbers determines whether or not the player is a winner. Generally, the more numbers (or, more precisely, the greater the percentage of the chosen numbers) that match, the more the player wins. Keno-type games are generally more flexible than bingo-type games because game participants can choose how many winning numbers they want to try to match in each game, for example two, five, ten, etc.

In casino (or computer-based) slots-type games, the game board comprises a movable matrix of symbols that are positioned on reels that are spun each time a game is played. Within the matrix, there may be one or more pay lines that, when a particular combination of symbols is obtained along one of the pay lines, the player is awarded a prize. When the spinning reels stop, the player is a winner if a particular pay line contains all the same type of symbol (e.g., a row of sevens or a row of cherries). Some combinations of different symbols may also be winning combinations and different symbols may have different winning values. For example, a row of all cherries may pay out less than a row of all sevens.

Such keno-type, bingo-type, or slots-type games may be played at designated venues (e.g., casinos or state lottery approved sites) or may be played using a computer system coupled to a communication network (e.g., the Internet). These and other fixed-odds wagering games of chance are popular because they are accessible, easy to understand, and easy to play. There is a present and recurring need for methods of making such and other games of chance more interesting, last longer, and provide more than one winner, while still having fixed odds to win and having a predetermined payout for a win. Such a game is needed to attract new game players and to provide existing players with enhanced entertainment.

SUMMARY OF INVENTION

New and more interesting game formats are needed for lottery and casino-type games that keep players' interest and therefore result in continued and/or return players. It is appreciated that there is a great deal of effort and expense to introduce additional games, especially in the casino area. In particular, as each game is introduced, its features are scrutinized by regulators prior to introduction. It therefore would be beneficial to be able to enhance the attractiveness of existing games to encourage player participation without the need for great regulatory effort. To this end, according to one aspect of the present invention, a system is provided that allows a player to participate in a game of chance that is already approved by regulators and the outcome of which is used to drive entry into and/or the outcome of another game.

Various aspects and embodiments of the present invention are directed to a points table that is associated with a first game, generally a fixed-odds wagering game of chance, with points being awarded to players of the first game based on the outcome of the first game and separate from any payout associated with the first game. A player may accrue points by playing the first game and may redeem those points in a variety of ways including, but not limited to, tickets for another game, cash, casino chips, discounts for goods, etc. In particular, according to aspects of the invention, the points may be awarded for "losing" the first game, thereby providing a dual incentive to a player to play the game—the player may achieve the game's payout by winning the game or may accrue points by losing the game. Such a dual incentive may attract new game players and may provide existing players with enhanced entertainment. "Losing" can occur in at least as many ways as there are of earning a payout in any particular game. In one example, losing can include not achieving the best available payout on a particular game, or in another example losing can be obtaining a payout of 0. The concept of "losing" may also embody various levels of losing, where the odds of obtaining a particular losing combination affect the degree of the loss and may affect the size of the points awarded, so as to create greater incentive.

According to one embodiment, a method of gaming comprises acts of entering a player in a first game, determining a result of the first game, providing the player with at least one of a payout and one or more points based on the result of the first game. In one embodiment, the player may receive the payout if the result of the first game indicates that the player is a winning player, and the player may receive the one or more points if the result of the first game indicates that the player is a losing player.

In another embodiment, a method of gaming comprises acts of entering a player in a first game, determining a result of the first game session, providing the player with at least one of a payout and one or more points based on the result of the first game session, wherein the first number of points is based at least in part on the first payout. In one embodiment, the method of gaming further comprises, entering a player in a second game session, determining the result of the second game session, providing the player with at least one of a second payout and a second number of points based on the result of the second game session, and wherein the second number of points is based at least in part on the second payout and the number of points earned in the first game. In one embodiment, there is an inverse relationship between the number of points awarded and the size of the payout for a particular result of a game. In one embodiment, a player may accumulate the points awarded over multiple game sessions. In one embodiment, a player may be limited to a specific time interval to accumulate points. In one embodiment, the method of gaming further comprises allowing a player to redeem points in exchange for a ticket to another game, cash, casino chips, or a discount on an item of merchandise. In one embodiment, the method of gaming further comprises tracking the player's performance over multiple game sessions. In one embodiment, the method of gaming further comprises adjusting the number of points awarded based on the player's performance over the multiple game sessions. In one embodiment, the act of adjusting the number of points provided includes an act of increasing the number of points provided to a player when the performance of the player indicates multiple losses.

According to another embodiment, a method of playing a game having an associated jackpot is disclosed. The method comprises acts of providing for at least two players to each play at least one game session of a first game during a predetermined time interval, providing for the at least two players to accrue points based on play of the at least one game session, and providing for a player of the at least two players who has accumulated the highest number of points at an end of the predetermined time interval to receive the jackpot, wherein points are accrued in an inverse relationship to the payout associated with the first game. In one embodiment, points are accrued in an inverse relationship to the payout associated with the first game.

In another embodiment, a method of playing a game comprises acts of providing for at least two players to each play at least one game session of at least one game, providing to each of the at least two players at least one of a payout and a number of points based on the result of the at least one game session of the at least one game, providing for each of the at least two players to accumulate the number of points awarded, providing a jackpot, and providing for a player of the at least two players who has accumulated the highest number of points to receive the jackpot. In one embodiment, the method of playing a game further comprises the act of tracking the performance of each of the at least two players over multiple game sessions. In one embodiment, the method of playing a game further comprising the act of adjusting the number of points awarded to a player based on a player's performance over multiple game sessions. In one embodiment, the number of points provided is in an inverse relationship to the payout associated with the at least one game session of the at least one game. In one embodiment, the method further comprises adjusting the number of points awarded based on a player's performance over multiple game sessions. In one embodiment, the jackpot includes a multi-race jackpot. In one embodiment, players are limited to a predetermined time interval, and the player who has accumulated the highest number of points after the predetermine time interval receives the jackpot.

In another embodiment a method for playing a game is disclosed, the method comprises acts of playing a first game session, receiving a first number of points based on an outcome of the first game, playing a second game session, wherein the probability of winning the second game is based at least in part on the first number of points. In one embodiment, the higher the number of points awarded the greater the probability that the player will win the second game. In one embodiment, the outcome of the first game includes a winning option and a losing option and a player is awarded a greater number of points for the losing option than for the winning option. In one embodiment, the method playing a game includes the act of redeeming the points awarded for a ticket for another game, cash, casino chips or a discount on an item of merchandise. In one embodiment, the player may accumulate points over multiple game sessions.

According to one aspect of the invention, a computer-readable medium is provided having computer-readable signals stored thereon that define instructions that, as a result of being executed by a computer, instruct the computer to perform a method for conducting a game. The method comprises the acts of entering a player in a first game session, determining a result of the first game session, providing the player with at least one of a first payout and a first number of points based on the result of the first game session, wherein the first number of points is based at least in part on the first payout. In one embodiment, the method further comprises the acts of tracking the player's performance over multiple game sessions and adjusting the number of points awarded based on the player's performance over the multiple game sessions. In one embodiment, the method further comprises the act of playing a second game session wherein the probability of winning the second game session is based at least in part on the first number of points. In one embodiment, the method further comprises an act of redeeming the first number of points for at least one of a ticket for another game, cash, casino chips and a discount on an item of merchandise.

According to another aspect of the invention, a computer-readable medium is provided having computer-readable signals stored thereon that define instructions that, as a result of being executed by a computer, instruct the computer to perform a method for conducting a game. The method comprises acts of providing for at least two players to each play at least one game session of at least one game, providing to the at least two players at least one of a payout and a number of points based on the result of the at least one game session of the at least one game, providing for the at least two players to accrue the number of points awarded, providing a jackpot, and providing for a player of the at least two players who has accumulated the highest number of points to receive the jackpot. In one embodiment, the method further comprises acts of tracking the performance of each of the at least two players over multiple game sessions and adjusting the number of points awarded to a player based on the player's performance over the multiple game sessions. In one embodiment, the associated jackpot includes a multi-race jackpot.

According to another aspect of the invention, a computer system for playing a game is provided. The system comprises means for allowing at least one player to enter to a first game session, means for awarding the at least one player at least one of a payout and a number of points based on the results of the first game session, and means for determining the number of points based at least in part on the payout. According to one embodiment of the invention, a computer system further comprises means for allowing for the at least one player to accumulate points, means for comparing the number of accumulated points between at least two players, means for awarding an associated jackpot to the player of the at least two players who accumulated the highest number of points. According to one embodiment of the invention, a computer system further comprises means for tracking the performance of the at least one player over multiple game sessions and means for adjusting the number of points awarded based on the at least one player's performance over the multiple game sessions.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
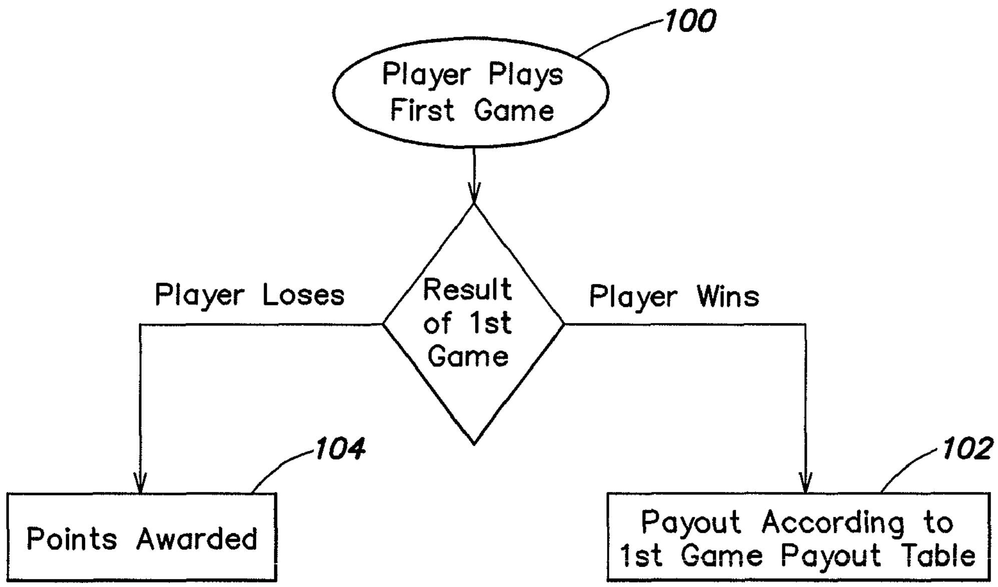
FIG. 1 is a flow diagram illustrating one example of a method of gaming according to aspects of the invention.

At least one embodiment and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Aspects of the present invention include a system and methods for a "double chance" game that links progress in a second game to the results of a first game. A player receives a chance at playing the second game based on winning or losing the first game, thereby providing the player with two chances to win for one entry into a game session. A player participating in the first game receives points, based on a result of the first game, that may be used to play a second game or may be redeemed for one or more prizes, as discussed below. The points may embody the player's chance for winning the second game. Generally, the first game may be a fixed-odds, wagering game of chance such as, but not limited to, keno, bingo, slots, and the like. A player may accrue points by playing the first game and redeem those points in a variety of ways including, but not limited to, tickets for another game, cash, casino chips, discounts for goods, etc. In particular, according to some aspects of the invention, the points may be awarded for "losing" the first game, thereby providing a dual incentive to a player to play the game—the player may achieve the game's payout by winning the game or may accrue points by losing the game. In such a manner, a player's interest in playing the first game may be increased because of additional chances to win offered by the second game (or selection of prizes) associated with the points the player receives during play of the first game.

According to one embodiment, the first game may have an associated payout table that may include a listing of the ways to obtain a payout and its payout amount. For example, if the first game is a keno-type game, a possible way to obtain a payout may include matching at least some of the winning numbers; if the first game is a bingo-type game, a payout may be obtained by completing a row or column of matched numbers.

The payout amount for each method of winning various games may depend at least in part upon the odds of obtaining the particular way to obtain a payout. For example, in a keno-type game, the odds of matching, for example, eight or ten winning numbers, may be substantially smaller than the odds of matching two or five winning numbers. However, the increase in the payout for matching ten winning numbers as opposed to five winning numbers may or may not be proportional to the decrease in the odds. A payout table may also include adjustments for various criteria including, for example, frequent player credits, number of players in a given game session, and the like. Of course, payout adjustments generally must meet any legal requirements for the gaming jurisdiction in which the game is played.

The payout table for each game session may also be supplemented by a jackpot that transfers from game session to game session. These types of jackpots are commonly called rolling or progressive jackpots. A rolling jackpot may be, for example, the same amount that transfers from game session to game session until it is paid out. A progressive jackpot is a rolling jackpot that increases as more game sessions, game cards, or other criteria are played. Rolling or progressive jackpots are typically paid out for a difficult way to match the drawn winning cell content. For example, in the case of the conventional game of bingo, if all cells of a five by five (5×5) matrix are covered in the first twenty-five drawn winning cell content or no cells are covered after fifty drawn winning cell content, the rolling jackpot may be paid out.

The final payout may also be affected as to whether the game has a fixed payout for a win or whether the payout is shared. If the payout is fixed for a win, according to one embodiment, all players that have a game card winner for a certain type of win will be paid the amount listed in the payout table for the win. In this instance, each player is playing solely against the game operator. If the payout is shared, then all players that have a game card winner for a certain type of win will be paid a total of the amount listed in the payout table. Each player may receive a share of the total payout depending upon how much he or she paid for the game or any other legal criteria.

According to one embodiment, a game session may include a points table that is linked to the payout table associated with the first game. A player may receive a certain number of points based on the payout the player receives from the first game. In one preferred embodiment, there may be an inverse relationship between the payout a player receives and the number of points the player gains. For example, if the player plays a keno game session and attempts to match five winning numbers, the payout and points received for matching any to all of the five numbers may be as shown below in Table 1. It is to be appreciated that Table 1 illustrates one example of possible payouts and that the invention is not limited to the particular example given in Table 1. For example, the payout may be higher or lower for any number of matches than what is shown in Table 1. Similarly, the points awarded for any number of matches may be higher or lower than shown in Table 1.

TABLE 1

| Number of Matched Winning Numbers | Payout in $ | Points Received |
|---|---|---|
| 0 | 0 | 50 |
| 1 | 2 | 20 |

TABLE 1-continued

| Number of Matched Winning Numbers | Payout in $ | Points Received |
|---|---|---|
| 2 | 6 | 12 |
| 3 | 12 | 6 |
| 4 | 20 | 2 |
| 5 | 50 | 0 |

Thus, the more winning numbers the player matches, the higher the cash payout received for playing the game, as is the case with conventional keno games. However, the fewer winning numbers the player matches, the more points the player receives for playing. In this manner, the player is provided with an incentive to play the keno game even if the player loses the game, because losing is rewarded with points. The points may be used to provide an entry into a second game. Therefore, by entering one game session of the first game, the player may in fact receive two chances to win—one chance to win the first game, and a chance to win a second game by using the points received from the first game to play the second game. In this manner, the player is provided with a "double chance" game.

Such a double chance game is unlike a simple conventional rewards or loyalty program because in these types of conventional programs, a player receives points for participating in a game, whereas the present invention rewards the player based on the player's performance in the game, not merely the player's participation in the game. For example, a typical rewards program may reward a player with a number of points (e.g., one point, five points, etc.) each time the player buys a ticket to play a game such as a keno game or slots game. Some programs may reward a player for playing a specific game (e.g., the player receives reward points for playing keno, but not for playing bingo) or for playing at a particular casino. However, in these programs, the rewards the player receives are not linked to the player's performance in a game and do not provide double chance games. In contrast, according to various aspects of the invention, a player receives points according to a function of how the player plays the first game, for example, according to the table above. Specifically, in some examples, the player may be rewarded for losing a game by being given a chance to win a second game.

According to one embodiment, the game may have an associated "memory" that monitors a player'success over multiple game sessions and awards points in one game session based at least in part on the player's performance in the previous game session. For example, referring to Table 2 below, a player may play a first game session of a keno-type game as discussed above with reference to Table 1. If the player plays a second game session, the points may be awarded according to column three in Table 2 ("Points Received for Second Game Session"). As shown in Table 2, the player may receive more points for losing the second time. Thus, this method of gaming provides an increased incentive for the player not only to keep playing, but to keep losing, because the more the player loses, the faster the player may earn points.

TABLE 2

| Number of Matched Winning Numbers | Payout in $ | Points Received for First Game Session | Points Received for Second Game Session |
|---|---|---|---|
| 0 | 0 | 50 | 65 |
| 1 | 2 | 20 | 30 |
| 2 | 6 | 12 | 20 |

TABLE 2-continued

| Number of Matched Winning Numbers | Payout in $ | Points Received for First Game Session | Points Received for Second Game Session |
|---|---|---|---|
| 3 | 12 | 6 | 10 |
| 4 | 20 | 2 | 5 |
| 5 | 50 | 0 | 0 |

According to at least one aspect of the invention, a payout and points system offers a player two chances of being rewarded for playing a game, as illustrated in FIG. 1. After beginning a game (item 100), if the player wins the game, the player receives a cash payout (item 102), as usual. However, if the player loses the game, the player still receives points for playing the game (item 104). There is thus an increased incentive to the player to continue to play because, whether the player wins or loses the game, the player is rewarded. In addition, as discussed above in at least one embodiment, there is provided a further incentive for the player to keep losing because the player may earn points faster by losing more often.

Of course, it is to be appreciated that the invention is not limited to the specific examples described above with reference to Tables 1 and 2. The principles of the invention may be applied to any fixed-odds game of chance and is not limited to keno-type games. The payout and points system may be applied to slots games, bingo-type games, and other types of games of chance. For example, applied to a slots game, the cash payout may be greatest for a matched row of sevens and thus may receive the fewest, or even zero points, whereas a losing result (e.g., a row that contains three different symbols and thus no matches) may receive a large number of points. Furthermore, the points received need not necessarily mirror the cash payout as shown in Table 1. Rather, for example, the number of points awarded for each game session may follow any arbitrary sequence that may be linear or non-linear.

According to one embodiment, a game session may include an associated points table that may be linked to the payout table of the first game based on some predetermined mapping function. Thus, any result of the game session yields a predetermined payout (according to the pay table) and a predetermined number of points awarded (according to the points table). One example of such a mapping may be the mirror arrangement shown in Table 1. However, many other mappings may also be suitable and the principles of the invention are not limited to any specific mapping. As discussed above, according to one preferred embodiment, the mapping of payout to points includes an inverse relationship between the payout and the points such that a player who receives a large payout (a "winning" player) receives only a small number of points, whereas a player who receives a small (or no) payout (a "losing" player) receives a large number of points.

In addition, according to one embodiment, the mapping may include a memory feature that may take into account the number of points a player received in an earlier game session. For example, the player may play a first game session and achieve a first number of points according to some first mapping between the game's payout and the points table. The player may then play a second game session and be awarded points based on a second mapping. For example, the second mapping may include doubling the points awarded if the player loses twice in a row, tripling the points if a player loses three times in a row, etc. Alternatively, the second mapping may add a certain number of additional points based on how the player did in the first game session. Using a keno example, if the player matches three out of five numbers, for example, in a first game session and receives X points, and then again matches three out of five numbers in a second game session, the player may receive X+Y points. Thus, although of course the invention is not limited to the specific mapping examples given herein, according to some aspects of the invention, a method of gaming may include awarding points to players based on a combination of the result of the current game session and one or more previous game sessions.

Points may be accrued by a player over many game sessions and may be redeemed in a variety of ways, as discussed below. According to one embodiment, a time period during which players may accumulate points may be predetermined by a game operator. For example, at a casino, time periods such as an hour, a day, or part of a day, may be offered during which players of one or more games may accrue points. Multiple players of one or several games may accrue points during the specified time period. In one embodiment, at the end of the specified time period, the player with the most points may win a jackpot or other prize.

According to one embodiment, points may be accrued towards a multi-race jackpot, as in the example given above. The term "multi-race jackpot" as used herein refers to a jackpot that accumulates over multiple game sessions of the same or different games and is vied for by multiple players. Multiple players of one or more games of chance may compete for a common jackpot that is tied to the points accumulated by playing the game(s). This jackpot may be unrelated to other winnings or jackpots associated with the game. For example, players participating in a keno game may win various payouts based on the number of winning numbers they match on each keno ticket for the game session. The points each player accrues during these keno game sessions may be used to compete for a second, separate jackpot that may be won, for example, by the player with the most points at the end of a given time period. As discussed above, in one preferred embodiment, a player may receive more points for losing the game than for winning, thus the second points jackpot is awarded to a player who has not received much or any payout from the game. However, it is to be appreciated that the invention is not so limited and does not require an inverse relationship between the game payout and awarded points.

In one embodiment, a multi-race jackpot may be funded by a retained portion of the fees paid by players to play each game. For example, multiple players during a given time period may purchase keno tickets for a certain dollar amount, a portion of which may be applied to the multi-race jackpot. At the end of the specified time period, the jackpot size is determined by the number of keno tickets purchased during the given time period. Such a funding mechanism may provide additional incentive to players to play more keno games so as to increase the jackpot size. This in turn may result in increased revenue for the game operator. In another example, the payout of the first game may be reduced in order to fund the second jackpot. For example, if the first game is slots, the payout for a 50-cent slots game may be made equivalent to a 25-cent game, the additional 25 cents per game being used to fund the second jackpot. In this manner, the second jackpot may be funded without loss of revenue to the game operator.

According to another embodiment, the points accrued by a player during one or more game sessions may be used to enter another game. For example, a player participating in a keno game may accrue points that may be exchanged for a seat at a poker table, for example, in lieu of the fee normally required for the seat. In another example, X number of points may be redeemable for Y hands of blackjack, wherein Y may typically be much smaller than X, but need not be. In one example, a certain number of points may be required to make the player eligible for another game, such as poker, roulette, or other game. The player may continue to accrue points by playing one or more games of chance (e.g., keno, bingo, slots, etc.) until the player has sufficient points to enter the second game. In one example, a time limit may be set in which the points must be accrued. Alternatively, players may accrue points indefinitely.

In another embodiment, the points may be used to gain the player an advantage in another game. For example, the points may be redeemed for poker chips. In this case, the more points a player has, the more chips he or she may be entitled to, thereby giving the player an advantage in the poker game. Thus, the points earned by playing a game of chance may be used to enter a game of skill, or alternatively another game of chance. For example, the points may be redeemed for additional keno or other game tickets. In another example, the points may be redeemable for cash or casino chips.

One illustrative example of how points may be used in a second game is in a "balloon pop" or similar game. These games may be played on a computer and some number of balloons in a game session may contain prizes. For example, a small number of balloons, e.g., one or two balloons, may contain a large prize (e.g., electronic equipment, nights at a casino hotel, etc.) and several balloons may contain smaller prizes. A player is allowed to "pop" a certain number of balloons based on, for example, an entry fee to the game, to attempt to locate a prize-containing balloon. Points may be used to play such a game by giving the player a certain number of "pops" in exchange for a number of points. For example, X number of points may be redeemable for Y number of balloons that may be popped, where X and Y may be the same or different. Thus, the more points a player accumulates, the more chances the player has to win a prize in the balloon game. Of course, the invention is not limited to a balloon pop game and the principle of exchanging points for tickets or entries to another game may be applied to any number and variety of games, as is appreciated by those skilled in the art.

According to another embodiment, the points may be redeemable online for goods or discounts on goods. For example, a player may visit a participating website and use the points in one of a variety of ways. In one embodiment, the website may contain a list of goods that may be purchased for fixed numbers of points. Once a player has accumulated the requisite number of points, the points may be redeemed for the specified item(s). In another example, the points may be used toward a product and the player may make up any difference in cash. In another example, the points may be redeemed for a discount on goods. For example, X number of points may give the player a 10% or 20% discount on any or some selected goods available for purchase on the website. Similarly, the points may be redeemable in these ways for goods sold, for example, at casino stores rather than online.

Figure 2:
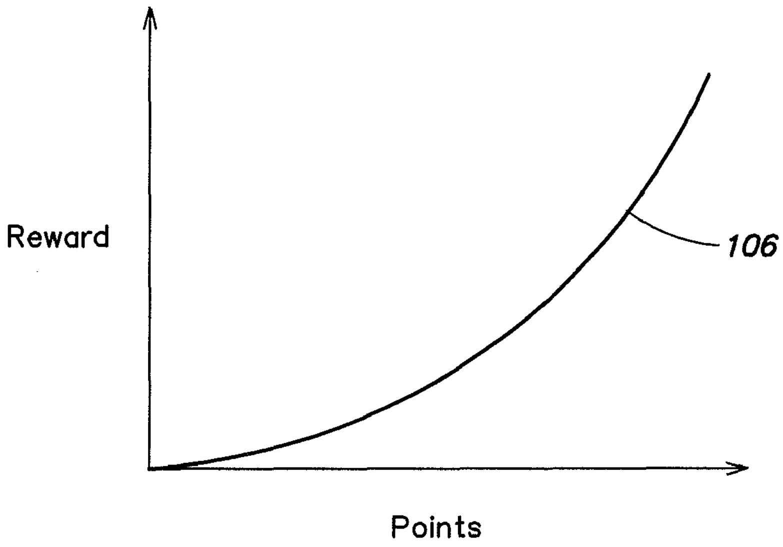
FIG. 2 is a graph illustrating one example of a relationship between points accrued and redeemable rewards.

Referring to FIG. 2, there is illustrated one example of a possible relationship between points accrued by a player and rewards attained by redeeming points. In this example, the curve 106 illustrates an exponential relationship between the value of the reward and number of points accrued. For example, if the reward is cash, the more points accrued, the higher the cash paid to the player. Alternatively, if the rewards are selected or discounted goods, the value of the goods (or percentage discount) may increase exponentially with the number of points the player accrues. Such an exponential relationship between points and rewards may provide additional encouragement to the player to continue to play games to accrue points so as to be eligible for a better reward.

According to another example, points may be accrued in an exponential manner as well. For example, one loss in a game session may give a player X points, whereas two losses in a row may give the player 2X points or Y points, where Y is larger than X, as discussed above. In such a manner, a player is provided with an incentive to keep playing in order to attain a better reward and an incentive to keep losing so as to accrue points faster and attain the reward. Of course, the player still has an incentive to win as provided by the payout associated with the game the player is playing.

It is to be appreciated that any of the first games (i.e., the game(s) that a player plays to accumulate points) and the second games (i.e., the games that the player uses his/her accrues points to play) may be played "manually" (e.g., using paper keno or bingo tickets) or on computers. In one embodiment, the game, the game sessions, and the game play may be partially or fully automated using one or more computer systems. For example, according to one embodiment, multiple players may participate in an online game session playing a first game, using a plurality of networked computers. A multi-race jackpot may be available to the player who, at the end of the game session (e.g., at the end of a predetermined time period) has the most points. Points may be accrued by the players and each player may be able to view his/her own number of points as well as the points accruing to other players in the game session. Thus, any player may be able to monitor his/her likelihood of winning the multi-race jackpot.

A computer system may be a single computer that may be, for example, a microcomputer, a mainframe, or a personal computer. A computer system used to run a game and its associated sessions may also include any combination of computer system types that cooperate to accomplish system-level tasks. Multiple computer systems may also be used to run a game. The computer system also may include input or output devices, displays, or storage units. It should be appreciated that any computer system or systems may be used, and the invention is not limited to any number, type, or configuration of computer systems.

Figure 3:
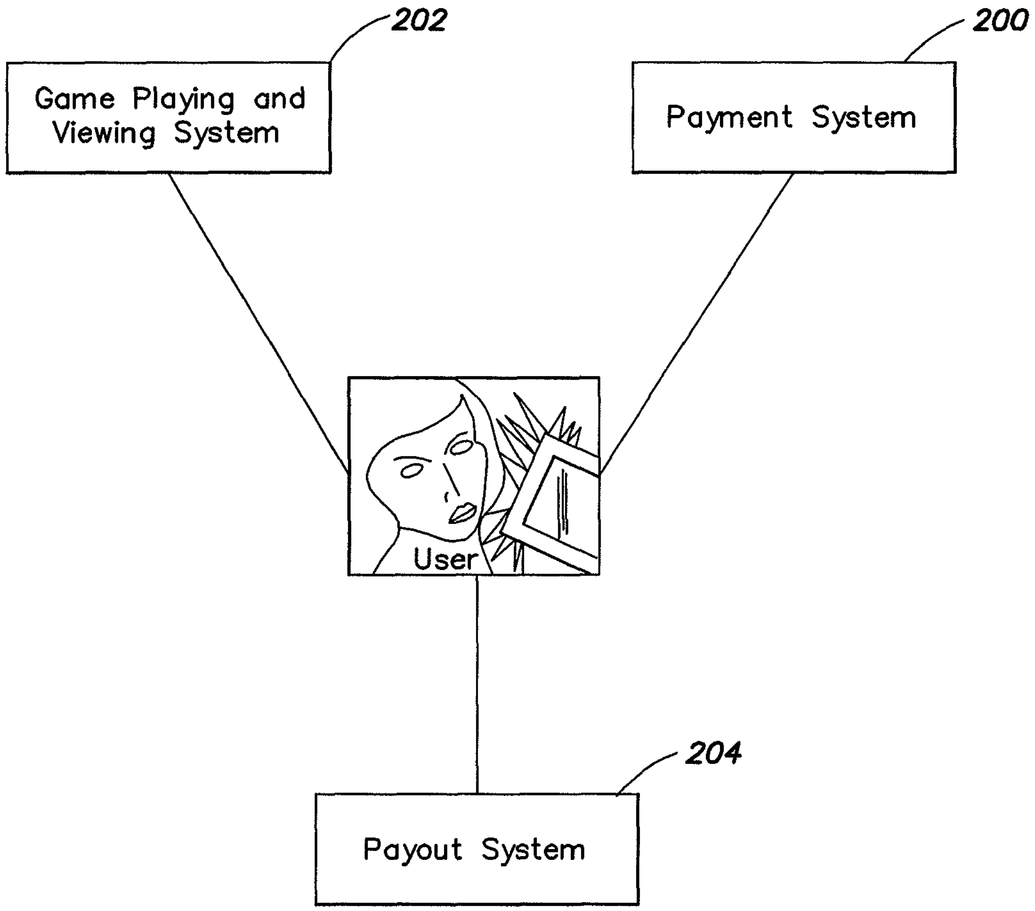
FIG. 3 is a block diagram illustrating one embodiment of a computer system according to aspects of the invention.

A computer system that executes a game according to various embodiments of the invention, may include, for example, three system components, as illustrated in FIG. 3. One system component may handle payment (payment component 200), subscription and/or alternate method of entry (AMOE) by players to enter the game sessions. Another system component may handle playing and viewing the game (game component 202) and a third system may handle payouts (payout component 204). Such a game system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below. The computer system may be adapted to handle entry by players into a variety of games, including games such as those described above.

The payment component 200 may include one or more of a number of well-known systems. For example, a player may be able to pay to play one or more games using a telephone and speaking with a call center representative who inputs player, payment and subscription information manually into a computer using a user interface. In the computer, data may be stored in a data structure that is stored in a memory of the computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various aspects of the invention include a graphical user interface (GUI), a display screen, a mouse, a keyboard, a keypad, a track ball, a microphone (e.g., to be used in conjunction with a voice recognition system), a speaker, a touch screen, a game controller (e.g., a joystick), etc., and any combinations thereof.

In addition, according to some embodiments, player information may be stored and linked to game progress to implement the "memory" aspect of awarding points as discussed above. For example, when a player achieves a certain number of points for a game, information (e.g., game played and number of points awarded) may be recorded by a computer so that an appropriate number of points may be awarded for the next game session the player participates in. This recording may be automatic for games played on a computer or may be controlled by, for example, a casino employee.

Player information may also be entered into a payment system component. Player information that may be input includes name, address, telephone number, and age, and payment information may include credit or debit card number or loyalty account information. A similar system may exist for players entering using the mail or a post card AMOE except the call center may be replaced by a mail center having representatives that enter information into one or more computers via a user interface. For example, a cashier who works at a casino directly with players that pay cash or credit to play, may also have the ability to input player, account, and subscription information for AMOE players using a user interface of a computer. In one embodiment, players may receive or may purchase a membership card that stores player information and may be used to track a player's participation in games and the number of points a player has accumulated. In one example, the membership card may be replaced by, or may include, for example, a hotel room keycard at a casino.

Computer systems or pay engines for handling electronic or online payment and subscriptions may also be used. Such systems are well known, and include such systems as Paypal, iKobo, Verisign, and other systems. Using such a system, a player interacts with a user interface to input information into a payment data structure that may be transferred to one or more payment systems (e.g., PayPal).

Various pay systems and one or more user interfaces may be located on computer systems coupled by a network with the computer system(s) storing data having player, account, and subscription information. As used herein, a "network" or a "communications network" is a group of two or more devices interconnected by one or more segments of transmission media or active communications equipment on which communications may be exchanged between the devices. Payout systems are also well known. Any of a number of standard systems or payout engines for making payouts for winning may be used.

It is to be appreciated that the principles of the invention, including providing a dual incentive to players of a first game by rewarding both winning and losing players, apply equally to manually operated games or computer-based games that may be played on a dedicated computing machine or over a network such as the Internet.

Having thus described several aspects of at least one embodiment of this invention, it is to be appreciated various alterations, modifications, and improvements will readily occur to those skilled in the art. Such alterations, modifica-tions, and improvements are intended to be part of this disclosure, and are intended to be within the scope of the invention. Accordingly, the foregoing description and drawings are by way of example only and are not intended to be limiting.

What is claimed is:

1. A method of gaming comprising acts of:

entering a player in a first game session;

determining a result of the first game session;

calculating a first payout corresponding to the result of the first game session from a payout table including entries for a first payout amount, a second payout amount, and a third payout amount, the first payout amount being greater than the second payout amount, and the second payout amount being greater than the third payout amount;

calculating a first number of points corresponding to the result of the first game session from a points table linked to the payout table, there being an inverse relationship between the first number of points and the first payout, a first amount of points corresponding to the first payout amount, a second amount of points corresponding to the second payout amount, and a third amount of points corresponding to the third payout amount, the third amount of points being greater than the second amount of points, and the second amount of points being greater than the first amount of points;

providing the player with at least one of the first payout and the first number of points; and providing for the player to redeem points for an increased probability of winning a second game.

2. The method of claim 1, further comprising acts of:

entering a player in a second game session;

determining a result of the second game session; and providing the player with at least one of a second payout and a second number of points based on the result of the second game session; and wherein the second number of points is based at least in part on the second payout and the first number of points.

3. The method of claim 1, further comprising an act of providing for the player to accumulate points over multiple game sessions.

4. The method of claim 3, wherein the multiple game sessions are played during a predetermined time interval.

5. The method of claim 1, further comprising an act of providing for the player to redeem the first number of points for at least one of a ticket for another game, cash, casino chips and a discount on an item of merchandise.

6. The method of claim 1, wherein a higher first number of points results in a greater probability of winning the second game.

7. The method of claim 1, further comprising an act of tracking performance of the player over multiple game sessions.

8. The method of claim 7, further comprising an act of adjusting the number of points provided to a player in an individual game session based on the performance of the player over the multiple game sessions.

9. The method of claim 8, wherein the act of adjusting the number of points provided comprises an act of increasing the number of points provided to a player when the performance of the player indicates multiple losses.

10. A computer-readable medium having computer-readable signals stored thereon that define instructions that, as a result of being executed by a computer, instruct the computer to perform a method for conducting a game, the method comprising acts of:

entering a player in a first game session;

determining a result of the first game session;

providing the player with at least one of a first payout and a first number of points based on the result of the first game session, the points redeemable for an increased probability of winning a second game; and wherein the first number of points is based at least in part on the first payout, and wherein there is an inverse relationship between the first number of points and the first payout.

11. The computer-readable medium according to claim 10, wherein the method further comprises acts of:

tracking performance of the player over multiple game sessions; and adjusting the number of points provided based on the performance of the player over the multiple game sessions.

12. The computer-readable medium according to claim 10, wherein the method further comprises acts of:

playing a second game session, wherein a probability of winning the second game session is based at least in part on the first number of points.

13. The computer-readable medium according to claim 12, wherein the method further comprises an act of redeeming the first number of points for at least one of a ticket for another game, cash, casino chips and a discount on an item of merchandise.

14. A system for playing a game on a computer system, the system comprising:

means for allowing at least one player to enter to a first game session;

means for providing the at least one player at least one of a payout and a number of points based on result of the first game session, the points redeemable for an increased probability of winning a second game; and means for determining the number of points based at least in part on the payout, wherein there is an inverse relationship between the number of points and the payout.

15. The computer system of claim 14, further comprising:

means for allowing for the at least one player to accumulate points;

means for the at least one player to view the number of points accumulated;

means for comparing the number of points of at least two players; and means for awarding an associated jackpot to a player of the at least two players who accumulated the highest number of points.

16. The computer system of claim 15, further comprising:

means for tracking performance of the at least one player over multiple game sessions; and means for adjusting the number of points provided based on the performance of the at least one player over the multiple game sessions.

* * * * *